United States Patent

Hagin et al.

[11] 4,216,684
[45] Aug. 12, 1980

[54] HYBRID DRIVE FOR MOTOR VEHICLES

[75] Inventors: Faust Hagin; Hans Hagen; Hans-Jürgen Drewitz, all of Munich; Erich Knirsch, Lohhof; Paul Merker, Munich, all of Fed. Rep. of Germany

[73] Assignee: Maschinefabrik Augsburg-Nuenberg Aktiengesellschaft, Munich, Fed. Rep. of Germany

[21] Appl. No.: 832,790

[22] Filed: Sep. 12, 1977

[30] Foreign Application Priority Data

Sep. 17, 1976 [DE] Fed. Rep. of Germany ....... 2641886

[51] Int. Cl.² .................................................. F16H 3/74
[52] U.S. Cl. ..................................... 74/751; 74/15.63; 74/15.86
[58] Field of Search ...................... 74/751, 15.6, 15.63, 74/15.66, 15.82, 15.84, 15.86

[56] References Cited

U.S. PATENT DOCUMENTS

| | | | |
|---|---|---|---|
| 2,168,033 | 8/1939 | Johnston et al. | 74/15.63 X |
| 2,459,092 | 1/1949 | Peterson et al. | 74/15.86 |
| 2,582,466 | 1/1952 | Strehlow | 74/15.63 |
| 2,935,899 | 5/1960 | Nallinger | 74/751 X |
| 3,132,533 | 5/1964 | Baker | 74/15.86 X |
| 3,540,297 | 9/1968 | Wagner et al. | 74/15.86 |
| 3,548,667 | 12/1970 | Hoover | 74/15.86 |
| 3,645,114 | 2/1972 | Shepherd | 64/14 |
| 3,665,788 | 5/1972 | Nyman | 74/751 |
| 3,672,244 | 6/1972 | Nasvytis | 74/751 X |
| 3,749,194 | 7/1973 | Bardwick | 74/751 X |
| 3,884,049 | 5/1975 | Pauli | 64/14 |
| 3,886,810 | 6/1975 | Sugiyama et al. | 74/751 |

FOREIGN PATENT DOCUMENTS

| | | | |
|---|---|---|---|
| 692107 | 8/1964 | Canada | 74/340 |
| 2343743 | 3/1975 | Fed. Rep. of Germany | 74/751 |

*Primary Examiner*—Samuel Scott
*Assistant Examiner*—Randall L. Green
*Attorney, Agent, or Firm*—W. G. Fasse; D. F. Gould

[57] ABSTRACT

The present hybrid drive is especially suitable for buses and the like which must make frequent stops. The engine, clutch, and automatic transmission are arranged in series. A flywheel energy storing device is coupled to the drive train by a further clutch. The automatic transmission is a power distribution transmission including a mechanical power transmission branch and a hydraulic power transmission branch. An auxiliary power take-off connects the flywheel to the drive train. The auxiliary power take-off is arranged laterally adjacent to the transmission. The connection point between the transmission and the auxiliary drive is constructed to take up power which, in addition to the engine power, is re-circulating through the hydraulic branch and which flows into the mechanical branch.

11 Claims, 3 Drawing Figures

HYBRID DRIVE FOR MOTOR VEHICLES

BACKGROUND OF THE INVENTION

The present invention relates to a hybrid drive apparatus for motor vehicles, especially buses or the like required to make frequent stops. Such vehicles are conventionally equipped with a drive train arranged in the direction of the longitudinal axis of the vehicle, whereby the prime mover or engine, the clutch and the automatic transmission are arranged in series. Such vehicles are also known to use a flywheel energy storage mechanism which may be coupled to the drive train by means of a separate clutch.

German Patent Publication (DOS) No. 1,812,480 discloses a drive mechanism of the above type. It is the purpose of such drive mechanisms to be used in vehicles employed for a so-called stop and go operation, for example, on buses running along established inner city lines stopping at every other block. As the brake is applied in operating such stop and go vehicles some of the brake power is recovered by charging up a flywheel. The energy stored in the flywheel is then employed as an auxiliary source of energy in addition to the prime mover, for accelerating the vehicle.

One problem with prior art hybrid drive systems of this type resides in the fact that the flywheel is supposed to deliver energy when its r.p.m. is diminishing, such energy being used to increase the r.p.m. of the drive train. On the other hand, the flywheel is supposed to increase its r.p.m. in order to store energy from the brake operation of the vehicle at which the r.p.m. of the drive train is diminishing. These two situations are actually incompatible with each other. Therefore, prior art systems of this type have frequently included a mechanism for transforming the mechanical energy into electrical energy or into hydraulic energy. The means employed for this purpose of energy transformation made the entire drive apparatus complicated. An alternative to the energy transformation involved the use of complicated gear trains interposed between the flywheel and the drive train. Such gear trains substantially increased the overall structural length of the drive train and required too much space. Another disadvantage of prior art devices is seen in that they have a very large additional structural weight which reduces or substantially limits the payload of vehicles equipped with such mechanisms. Besides, such additional weight would in turn substantially use up the energy which would be saved by the use of the flywheel operation. As a result, the so-called hybrid drive employing a flywheel has not found heretofore any practical use worth mentioning.

OBJECTS OF THE INVENTION

In view of the foregoing, it is the aim of the invention to achieve the following objects, singly or in combination:

to construct a motor vehicle, or rather the hybrid drive system for a motor vehicle especially of the stop and go type, in such a manner that the flywheel and its connection to the main drive train of the vehicle requires but a minimal additional space in the vehicle;

to employ a hybrid drive system wherein the overall length of the drive train including the prime mover, the clutch, and the transmission, is not increased at all so as to make do with the structural length available in prior art vehicles;

to avoid increasing the structural weight of vehicles equipped with the present hybrid drive system as compared to conventional vehicles having but one prime mover;

to construct a vehicle of the present type in such a manner that it will substantially correspond to conventional vehicles without a flywheel storage mechanism, stated differently, conventional vehicles shall be suitable for equipping such vehicles with the present hybrid drive mechanism in such a manner that only few modifications will be necessary to be made to conventional vehicles produced on assembly lines;

to generally increase the efficiency of a hybrid drive system;

to equip a vehicle of the described type with a hybrid drive system while maintaining the production costs at such a level that the production costs do not eat up any savings that may be accomplished by using less energy due to the flywheel operation;

to employ a flywheel energy storage mechanism which will avoid the energy transformation deemed necessary heretofore; and to optimize the use of the available space in such a manner that the universal coupling angles for the connecting shaft are as small as possible.

SUMMARY OF THE INVENTION

According to the invention there is provided a hybrid device mechanism for a motor vehicle, especially a bus of the stop and go type, wherein the automatic transmission is a power distribution transmission which is known as such and which comprises a mechanical power branch as well as a hydraulic power branch. The flywheel is connected to the drive train by means of an auxiliary power take-off arranged laterally relative to the transmission. The connection point of the auxiliary power take-off is located between the transmission and the auxiliary drive means in such a manner that it is capable of taking up power, which in addition to the power of the prime mover, is re-circulating through the hydraulic branch and which flows into the mechanical branch. The main advantage of the arrangement according to the invention is seen in that due to the connection of the flywheel to an auxiliary power take-off of the transmission, no additional structural length of the drive train will result as compared to well known conventional structures without a flywheel. Another advantage is seen in that the manufacturing costs as well as the weight of the connecting devices may be maintained at a very low level. Another advantage is seen in that due to the use of an automatic power distribution transmission having a hydraulic and a mechanical power branch, there is given the possibility to solve the above described problem of storing energy in the flywheel and retrieving energy from the flywheel without an energy conversion, for example, in electric machines forming part of the system. Under extreme operating conditions, for example, when the flywheel is to be accelerated from a standstill when the vehicle is not moving, there may be employed mechanical clutch between the flywheel and the power distribution transmission on the one hand, and on the other hand, the mechanical clutch or coupling between the prime mover and the power distribution transmission. It has been found, that the arrangement of the components according to the invention may be accomplished in a structural, technical sense while simultaneously being capable of taking care of all possible operational requirements or conditions applicable to an inner city line bus.

According to a preferred embodiment of the invention, the auxiliary power take-off comprises a gear wheel which is arranged for meshing cooperation with a gear wheel of the connecting pair of gear wheels between the mechanical and the hydrostatic branch of the transmission.

BRIEF FIGURE DESCRIPTION

In order that the invention may be clearly understood, it will now be described, by way of example, with reference to the accompanying drawings, wherein.

DETAILED DESCRIPTION OF PREFERRED EXAMPLE EMBODIMENTS

Figure 1:
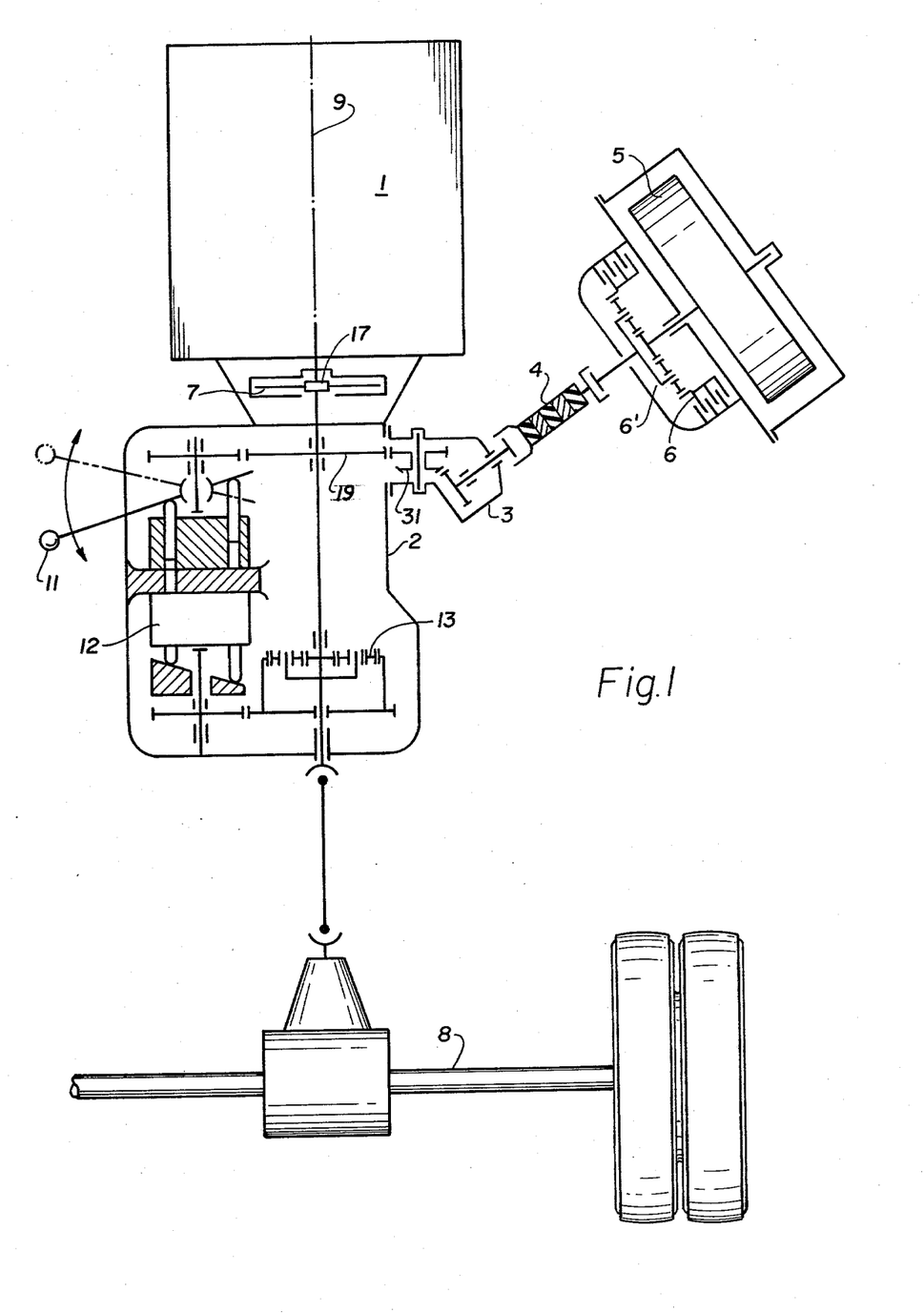
FIG. 1 is a somewhat schematic illustration of a hybrid drive mechanism according to the invention.

FIG. 1 illustrates a drive train for a motor vehicle having a driven axle or shaft 8. A prime mover or engine 1, a slip clutch 7, and a power distribution transmission 2 are arranged in series in that order. Between the engine 1 and the transmission 2 there may be arranged, if desired, a free wheeling mechanism 17. The power distribution transmission 2 comprises a hydraulic branch 12 and a mechanical branch 13, whereby a gear wheel 19 operates as a branching means. The power transmission through the hydraulic branch 12 may be controlled by means of a lever 11. The flywheel 5 is connected laterally to one side of the transmission 2 by means of a further clutch, such as a slip clutch 6 and by means of a reduction gear 6' as well as by means of a connecting shaft 4 and through an auxiliary power take-off 3 connected, as mentioned, laterally to the transmission 2. The connecting shaft 4 is connected through the auxiliary power take-off 3 to the power distribution transmission 2 by means of said gear wheel 19 and further gears 31 in the power take-off 3. The flywheel 5 may be disconnected from the transmission 2 at any time by means of the clutch 6. The control of the driving arrangement illustrated in FIG. 1 is accomplished by means of a control system illustrated in FIG. 2. A control or regulating member 10 is the main component of such control system.

Figure 2:
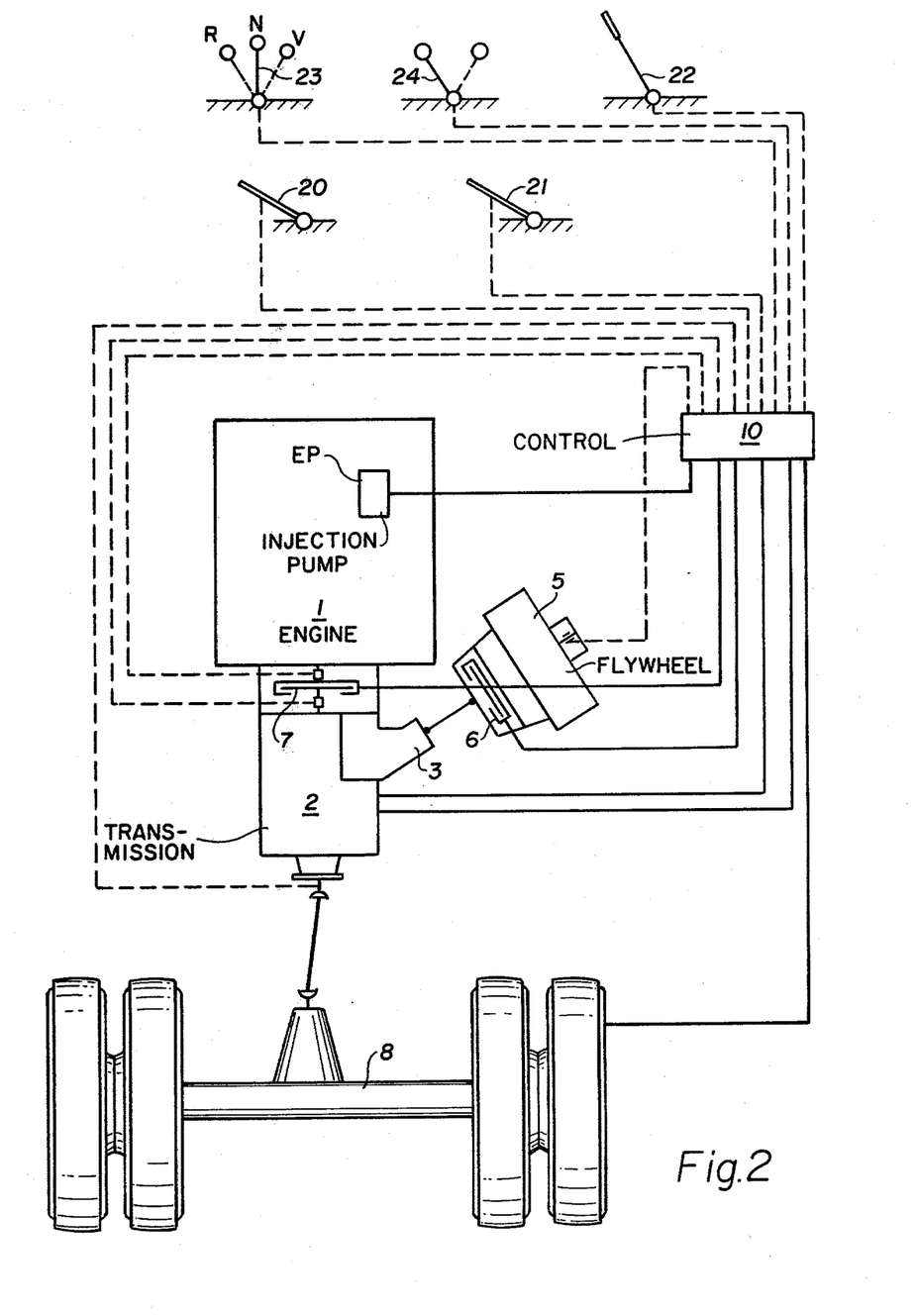
FIG. 2 illustrates a control circuit arrangement for operating the drive system according to FIG. 1.

Referring to FIG. 2, a foot pedal 20 is connected to the control member 10 in a operative manner, for example, through a hydraulic power transmission. Similarly, a brake pedal 21, an emergency brake 22, and a speed control preselector lever 23 are also connected by conventional means to the control member 10. The speed selector lever 23 may, for example, be shifted from neutral to reverse or to forward. A further lever 24 also normally operable by the operator of the vehicle, is provided for the control of the flywheel as well as for the control of the motor brake circuit.

Further operative connections are provided between the control or regulating member 10 and r.p.m. sensing devices operatively connected to the output of the prime mover 1, as well as at the input and at the output of the power distribution transmission 2 and at the flywheel 5. These operative connections are shown in FIG. 2 by dashed lines. Additional operative circuit connections are arranged between the control member 10 and the clutch 7 positioned between the prime mover 1 and the transmission 2, as well as to the clutch 6 connected to the flywheel 5, and to the lever 11 as well as to the conventional vehicle brake, and to the control means EP of the prime mover 1.

The operation of the present control system will now be described with reference to a diesel engine forming the prime mover of the vehicle. The starting of the vehicle takes place when the emergency brake is engaged and the flywheel is at a standstill. The preselector lever 23 is in the neutral position. The flywheel control is switched off and the clutch 6 is disengaged. The engine 1 is started conventionally by the operator. The charging of the flywheel during the standstill of the vehicle is accomplished in that subsequent to the starting of the engine the flywheel control is switched on. When the foot pedal or drive pedal 20 is in zero or neutral position, the clutch 6 is respectively disengaged and the preselector lever 23 remains in its neutral position. By stepping on the foot pedal the clutch 6 is engaged and the clutch 7 is disengaged while simultaneously the r.p.m. of the engine is increased to a rated r.p.m. value at which point the clutch 7 is engaged subsequent to the engaging of the clutch 6, for example, by means of an r.p.m. representing signal which may, for example, be derived from a centrifugal governor or the like. The clutch 7 is engaged in a slipping manner. Thereafter, the r.p.m. of the flywheel 5 and the r.p.m. of the motor are increased to the maximum r.p.m. whereupon the operating pedal is released and the respective clutch 6 is disengaged, thereby decoupling the flywheel from the auxiliary power take-off 3.

The acceleration is accomplished by first moving the preselector lever 23 into the forward position "V". To accelerate the vehicle, the diesel engine is used initially. The engine is coupled to the transmission by engaging the clutch 7 while the clutch 6 is disengaged or open. When now the driving or gas pedal 20 is actuated, the r.p.m. of the engine increases in accordance with the transmission characteristic to a value corresponding to about 50% of the maximum engine r.p.m. Upon reaching the full load characteristic line, the r.p.m. still increases along this line until the maximum r.p.m. is reached. Upon reaching the synchronious r.p.m., the clutch 6 is engaged whereby the flywheel 5 is coupled to the auxiliary power take-off 3 whereupon the flywheel 5 contributes to the acceleration. At the end of the acceleration phase, the flywheel 5 has reached its minimum r.p.m. At that point the flywheel is automatically decoupled and the power consumption is supplied solely by the engine 1. When the mentioned synchronious r.p.m. is below the minimum r.p.m., the flywheel 5 is not engaged at all for contributing to the power consumption.

The gas foot pedal 20 has two positions or stages. When the gas foot pedal is in its first stage, the engine is accelerated to the above mentioned increased constant r.p.m. corresponding to about 50% of the maximum r.p.m. In this first position or stage of the pedal 20, it is effective only on the injection pump EP. At the end of this first stage of the pedal 20, the injection pump EP has reached its maximum or full position. At this point, the engine 1 has the respective maximum power output corresponding to this r.p.m.

The second position or stage of the pedal 20 starts with a further increasing of the r.p.m. of the engine by means of the transmission ratio control of the power distribution transmission. When the above mentioned synchronious r.p.m. has been reached, the flywheel 5 is coupled through the auxiliary power take-off 3 to the transmission 2 and the engine remains connected depending on the power requirements or the engine may be switched off whereby the switching on and off of the engine is controlled by a control mechanism operating on the principle of a constant total kinetic energy of the vehicle and the flywheel. In other words, under this principle the sum of the two energies is always constant. Thus, when the energy of the flywheel 5 is discharged while the engine is engaged through the clutch 7, the engine r.p.m. is reduced and correspondingly the flywheel r.p.m. is reduced whereby the drive system continues to operate at its full load or rather at its optimum operational characteristic.

If the r.p.m. of the flywheel has decreased to its minimum value the flywheel is automatically disengaged through a respective disengagement of the clutch 6 and the engine 1 is automatically coupled to the drive train by engaging the clutch 7.

A constant vehicle speed is maintained after completion of the acceleration phase at which times the r.p.m. of the flywheel 5 has fallen to the permissible minimum. The flywheel is not automatically decoupled by disengaging the clutch 6 and by engaging the engine 1 through the respective clutch 7 as mentioned above whereby the power required by the constant speed of the vehicle is supplied solely by the engine 1. However, if the r.p.m. of the flywheel 5 should not yet have fallen to its minimum value, the flywheel 5 is further discharged during constant vehicle speed until its minimum r.p.m. is reached. A further charging or recharging of the flywheel 5 during the constant vehicle speed operation is possible by means of a respective control or switching signal which causes the engagement of the flywheel clutch 6 and which also brings the engine 1 to its full load operational line in its characteristic curve. Upon reaching the maximum r.p.m., the flywheel 5 is automatically decoupled by disengaging the clutch 6. Although rarely required, this type of recharging is also possible during a slow acceleration.

The brake pedal 21 also has two functional ranges in the same manner as the acceleration pedal 20. In the first operational range of the brake pedal 21, the engine 1 is disengaged from the transmission and the clutch 6 is also disengaged whereby the engine is brought to its idling r.p.m. The power distribution transmission 2 receives a control signal from the brake pedal 21 when the latter is in its first operational range whereby the r.p.m. at the input of the transmission is increased by varying the transmission or translation ratio in the transmission 2 while simultaneously and for the moment still maintaining substantially the same power take-off or output r.p.m. at the output of the transmission 2. When the input shaft to the transmission 2 has reached the synchronious r.p.m. for coupling the flywheel 5 to the power drive train, the clutch 6 is engaged and the flywheel 5 is coupled to the system. The brake moment depends on the position of the brake pedal 21 because the transmission or translation ratio is varied by the control oil pressure produced by the brake pedal 21. The r.p.m. of the flywheel 5 is thus increased whereby the flywheel 5 is charged for the storing of energy while the vehicle is subjected to a braking action. When the flywheel 5 has reached its maximum r.p.m. prior to the stopping of the vehicle, the flywheel will be disengaged or decoupled. At this point, a motor brake becomes effective. Stated differently, the motor is again coupled to the drive train whereby the clutch 7 is engaged and the injection pump is switched off while the exhaust gate is closed. The brake pedal continues to operate as a control member for the brake moments applied to the wheels because the motor r.p.m. is increased or decreased depending on the varying of the transmission or translation ratio. The relatively small braking moment of the motor brake may be automatically compensated by switching on or actuating the operational brake mechanism.

The second operational range of the brake pedal 21 makes certain that in this position the normal operational brake is effective in addition to the flywheel brake or to the motor brake. The seperation into two braking ranges may be avoided if, as mentioned above, the operational brake is automatically switched on so that the brake moment is produced proportionally to the displacement of the brake pedal and due to an automatic combination of the relevant brake functions.

A recharging or additional charging of the engine 1 is possible during the braking operation. If, during the braking, the brake energy is not sufficient to fully charge the flywheel 5, the above mentioned control unit 10 switches on the motor in accordance with the above mentioned principle of constant kinetic total energy of the vehicle and the flywheel so that the engine will additionally drive the flywheel 5 if desired.

Standstill of the vehicle at a stop, such as a bus stop, involves switching off the flywheel by disengaging the clutch 6 and the motor is coupled to the transmission 2, since the clutch 7 is engaged. If the flywheel 5 is to be further charged or recharged this may be accomplished in the following manner. The emergency brake 22 is actuated, the transmission preselector level 23 is brought into its neutral position and the drive pedal 20 is actuated. In the second operational range of the drive pedal 20, the flywheel 5 is recharged or charged again as described above.

A braking action may also be applied to the flywheel 5 when it is desired to not only stop the vehicle, but also the flywheel. For this purpose, the flywheel 5 is subjected to a braking action together with the engine 1 while the gear transmission 2 is in its neutral position. The flywheel 5 and the engine 1 are subjected to said braking action until the zero r.p.m. is reached and while the flywheel is coupled to the engine through the engaged clutches 6 and 7 while simultaneously switching off the injection pump and closing the exhaust pipe or gate.

With regard to the size of the flywheel 5, the invention suggests that it should be related to the power rating of the prime mover 1 by the relationship $$\tfrac{1}{2}\theta_s w_s^2 (KWH) = 5.5 \cdot 10^{-3} N_A (KW).$$

Further, the size of the flywheel should also be related to the total weight G of the vehicle in which the flywheel is installed as follows:

$$\tfrac{1}{2}\theta_s w_s^2 (KWH) = 3.4 \cdot 10^{-2} G(ton).$$

In the foregoing relationships, the letters or symbols have the following meaning.

$\theta_s$ is the inertia moment of flywheel in relation to its rotation axes;
$w_s$ is the angular relocity of flywheel;
KWH is unit of work;

$N_A$ is power rating of prime mover expressed in KW

KW is unit of power rating and

G is the weight of the vehicle expressed in tons.

According to the invention, a relatively small sized flywheel is employed which is dimensioned so that it is capable to take up the energy of a full braking action of the vehicle whereby such braking action starts from a normal operational speed of the vehicle while the latter is carrying a mean or average load. With this teaching it is now possible to construct the vehicle or vehicles in a conventional series or assembly line fashion whereby merely a relatively small sized engine is used. The same considerations apply with regard to the space required for the flywheel since the flywheel having the above defined dimension relative to the total weight of the vehicle and relative to the installed power of the prime mover, is of such a size, that the avaible space in a conventionally constructed vehicle is just sufficient to accommodate the flywheel without the need for varying the entire design or structure of the vehicle.

The above described control circuit of the invention with the controller 10, for example in the form of a hydrualic system with the necessary valves, constitutes an automatic control or regulating device which causes a coupling of the flywheel to the drive train during the acceleration phase of the vehicle in a range corresponding to $0.65n_{Amax}$ whereby $n_{Amax}$ corresponds to the maximum drive r.p.m. of the prime mover. This feature of the invention makes it possible that the useful energy content of the flywheel may be smaller than the energy that would be necessary for an acceleration of the vehicle from standstill to the maximum speed of the vehicle because the driving engine power is also utilized for accelerating the vehicle.

As shown in FIG. 1, the longitudinal axis of the auxiliary power take-off 3 and the shaft 4 is arranged at an angle relative to the longitudinal axis 9 of the vehicle or rather of the prime mover drive train. According to the invention such angle should be within the range of about 50 to about 70 degrees. This arrangement of the flywheel 5 has been found to be advantageous because on the one hand, it is possible to employ relatively small and hence inexpensive structural elements such as gear wheels for the power transmission between the automatic transmission 2 and the flywheel 5. On the other hand, this feature has the advantage that the flywheel 5, the clutch 6 and the respective reduction gear 6' may be arranged in a location within the vehicle somewhat removed from the immediate vicinity of the prime mover drive train including the engine 1 and the automatic transmission 2.

Another advantage may be achieved by the teaching of the invention if the connecting shaft 4 between the flywheel 5 and the auxiliary power take-off 3 is constructed as a so called double bow gear clutch, whereby further space may be saved or the available space may be utilized in an economic manner. Such a double bow gear clutch permits using the spacing between the flywheel 5, which is rigidly mounted in the vehicle, and the automatic transmission 2, which is yieldingly mounted in the vehicle, in a most economic manner thereby achieving universal joint angles for the connecting shaft 4, which are as small as possible. Such economic space utilization would not be possible if one would use, in a conventional manner, two universal joint heads instead of the double bow gear clutch. Such universal joint heads would increase the effective spacing between the universal joints by a length corresponding to twice the length of a universal joint head whereby the respective universal joint angles would be increased.

Preferably, the connecting shaft 4 between the flywheel 5 and the power take-off 3 should comprise torque components made of so called metal rubber elements which are known as such in the art.

In addition to the above mentioned angle between the longitudinal axis 9 and the shaft 4, the latter should also be tilted downwardly by an angle within the range of about 5 to 20 degrees. This feature also contributes to an efficient space utilization, especially where the drive system of a bus is mounted at the rear end of the bus.

In a preferred embodiment of the invention, the above mentioned free wheeling device 17 is arranged between the prime mover 1 and the power distribution transmission 2 whereby the free wheeling device permits to provide the prime mover 1 with a higher r.p.m. than would normally be possible. This feature has the advantage that the costs for the control system may be substantially reduced because in this instance it is not necessary to provide for comparing the r.p.m. at the shaft of the prime mover with the r.p.m. at the transmission input shaft.

Control member 10 may be of electric, hydraulic, mechanical or pneumatic construction.

Control member 10 comprises a graduating valve the operation of which is dependent on accelerator pedal 20 and by means of which lever 11 of the hydraulic brake 12 is adjusted. Further control member 10 comprises comparator means for the speed of the engine 1 and the speed of flywheel 5, these comparator means causing engagement of clutches 6 and 7 in case of equal speeds of engine 1 and flywheel 5.

Control member 10 further comprises means for comparing the speed of flywheel 5 and the output speed of transmission 2, said means operating clutch 7 and the fuel supply of the engine 1.

Control member 10 comprises rpm control means for the flywheel said control means causing the engagement or disengagement of clutch 6 so that the speed of the flywheel can be kept within predetermined borders.

Control member 10 further comprises a switch mechanism for operating the conventional vehicle brake and a motor brake. In dependence of the position of the brake pedal 21, the rpm of flywheel 5 and the speed of the vehicle (or the output rpm of the transmission) said switch mechanism controls the effective amount of brake power by putting in circuit the conventional brake if high retardation of the vehicle is desired.

Figure 3:
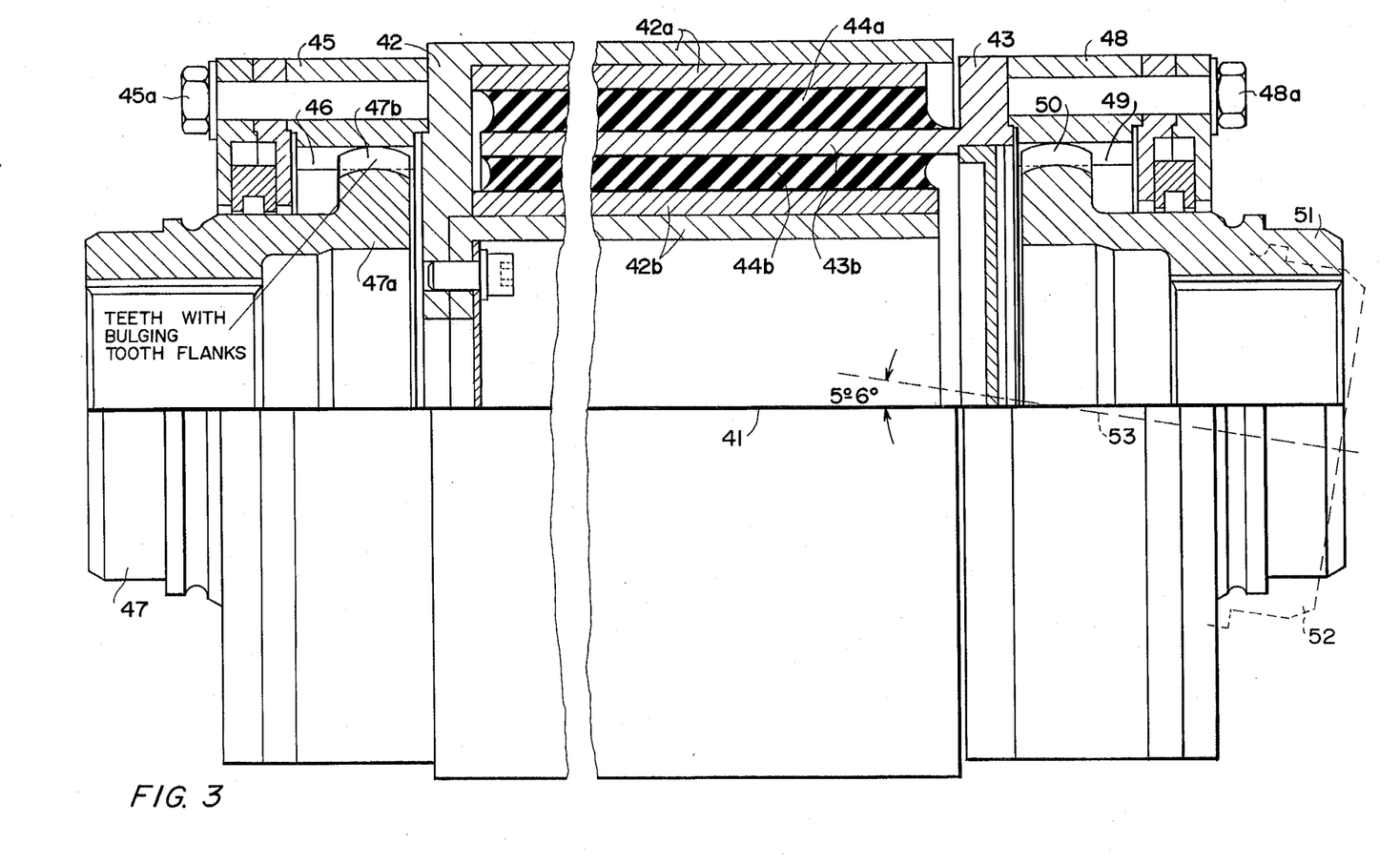
FIG. 3 shows a double bow gear clutch as used in shaft 4.

FIG. 3 shows a double bow gear clutch which may be interposed instead of the connecting shaft 4 between the flywheel 5 and the auxiliary power take-off 3. FIG. 3 illustrates the structure of a double bow gear clutch on an enlarged scale relative to the illustration in FIG. 1. The rotational axis 41 of the flywheel 5 is also the rotational axis of the double bow gear clutch which substantially comprises a left-hand flange 42 and a right-hand flange 43. The left-hand flange 42 comprises an outer sleeve 42a and an inner cylindrical sleeve 42b surrounded by the outer sleeve 42a. The right-hand flange 43 comprises a sleeve 43b with a diameter intermediate the sleeve 42a and 42b so that the sleeve 43b may reach into the space formed between the sleeves 42a and 42b. All sleeves are cylindrical.

The sleeve 43b has secured to its outer circumferential surface a rubber layer 44a. A further rubber layer 44b is secured to the inner surface of the sleeve 43b.

These rubber layers 44a and 44b may be vulcanized to the surfaces of the sleeve 43b. The rubber layer 44a is also rigidly secured to the inner surface of the outer sleeve 42a. The inner rubber layer 44b is also rigidly secured to the radially outer surface of the inner sleeve 42b. Thus, an elastic coupling is provided between the left sleeve members 42a and 42b on the one hand and the cylindrical sleeve 43b on the other hand.

A gear ring 45 is secured to the flange 42, for example, by screw bolts 45a. The gear ring 45 comprises radially inwardly pointing gear teeth 46. A bushing 47 comprises a gear ring 47a with gear teeth 47b having bulging tooth flanks and meshing with the gear teeth 46 of the gear ring 45. The gear teeth 47b also have bow shaped radially outwardly facing surfaces as shown in FIG. 3. Thus, these teeth are referred to as bow teeth.

Another gear ring 48 is secured to the facing surface of the flange 43 by screw bolts 48a. The gear ring 48 is also provided with radially inwardly facing gear teeth 49 which cooperate with bow teeth 50 of a further gear bushing 51. Both, the gear bushing 47 and the gear bushing 51 may take up positions at an angle relative to the rotational axis 41 as shown in dashed lines at 52 in FIG. 3.

The two just described bow teeth gears 47b and 50 in cooperation with the gear teeth 46 and 49 constitute a so-called double bow gear clutch. Due to the shape of the teeth 47b and 50 it is possible that the bushing 51 can take up the dashed line position 52. Similarly, the bushing 47 can also take up an inclined position relative to the rotational axis 41. Therefore, an angle may be established between the rotational axis 41 and the axis 53 of the bushing 51. A similar angle may be taken up by the axis of the bushing 47 relative to the rotational axis 41 whereby the total angular slanting may be within the range of up to 12° since each bushing 47, 51 is able to slant to an extent indicated by the angle range of 5° to 6°.

Although the invention has been described with reference to specific example embodiments, it will be appreciated, that it is intended to cover all modifications and equivalents within the scope of the appended claims.

What is claimed is:

1. A hybrid drive for motor vehicles comprising a drive train including prime mover means, first clutch means (7) and standard automatic transmission means (12, 13) having a power input and a power output arranged in series whereby the direction of power flow is from said prime mover means through said first clutch means (7) to said power input of said automatic transmission means, flywheel means (5), auxiliary power take-off means (3) and second clutch means (6) operatively connecting said flywheel means (5) to said automatic transmission means (2) through said auxiliary power take-off means (3), said standard automatic transmission means comprising a mechanical power transmission branch (13) including a single planetary gear set means, a hydraulic power transmission branch (12) and a single branching gear means (19) operatively interposed between said power input and said transmission branches (12, 13), said auxiliary power take-off means (3) operatively connecting said flywheel means (5) to one meshing point of said single branching gear means (19) of said automatic transmission means (2) substantially at a point near said power input of said automatic transmission means and upstream of said single planetary gear set means (13) as viewed in said power flow direction, said branching gear means (19) being also operatively connected to said hydraulic power transmission branch (12) at a further meshing point of said same single branching gear means (19), whereby said flywheel means (5) and said hydraulic power transmission branch (12) are connected in parallel to said single branching gear means (19), and wherein said planetary gear set means, and said hydraulic power transmission branch (12), are operatively connected to said power output.

2. The hybrid drive of claim 1, wherein the size(S) of said flywheel means is determined relative to the power of the prime mover means by the relationship:

$$S = \tfrac{1}{2}\theta_s \cdot w_s^2 \, (KWH) = 5.5 \cdot 10^{-3} N_A \, (KW),$$

wherein
$\theta_s$ = inertia moment of flywheel in relation to its rotation axes
$w_s$ = angular velocity of flywheel
KWH = unit of work
$N_A$ = power rating of prime mover
KW = unit of power rating.

3. The hybrid drive of claim 1, wherein the size (S) of the flywheel means is determined relative to the total weight of the vehicle by the relationship:

$$S = \tfrac{1}{2}\theta_s \cdot w_s^2 \, (KWH) = 3.4 \cdot 10^{-2} G,$$

wherein
$\theta_s$ = inertia moment of flywheel in relation to its rotation axes
$w_s$ = angular velocity of flywheel
KWH = unit of work
G = is the total weight of the vehicle in tons.

4. The hybrid drive of claim 1, further comprising automatic control means operatively connected to said drive train, to said flywheel means and to said second clutch means (6) to operatively connect the flywheel means (5) to said automatic transmission means during the acceleration phase of the vehicle when the r.p.m. of the drive train is within the range of 0.65 to 1.0 of the maximum r.p.m. of the drive train.

5. The hybrid drive of claim 1, wherein said auxiliary power take-off means (3) comprise a rotational axis extending at an angle relative to the rotational axis of the drive train, said angle being within the range of substantially 50° up to substantially 70°.

6. The hybrid drive of claim 1, wherein said second clutch means called comprises a double bow gear clutch.

7. The hybrid drive of claim 1, further comprising connecting shaft means between said flywheel means and said auxiliary power take-off means, said connecting shaft means comprising torque components including metal rubber elements.

8. The hybrid drive of claim 1, wherein said flywheel means have a rotational axis extending at a slant angle relative to a horizontal plane, said rotational axis of the flywheel means extending through the rotational axis of said drive train, said slant angle being within the range of substantially 5° to substantially 20°.

9. The hybrid drive of claim 8, wherein said slant angle tilts downwardly from said horizontal plane.

10. The hybrid drive of claim 1, further comprising free wheeling means operatively interposed between said prime mover means and said automatic transmission means, said free wheeling means permitting a larger r.p.m. at the automatic transmission input than the r.p.m. of the prime mover means.

11. The hybrid drive means of claim 1, further comprising coupling means between said flywheel means (5) and said auxiliary power take-off means (3), said coupling means comprising universal joint coupling members.

* * * * *

UNITED STATES PATENT OFFICE
CERTIFICATE OF CORRECTION

Patent No. 4,216,684    Dated August 12, 1980

Inventor(s) Faust Hagin et al

It is certified that error appears in the above-identified patent and that said Letters Patent are hereby corrected as shown below:

--[73] Assignee: Maschinenfabrik Augsburg-Nuernberg Aktiengesellschaft, Munich, Fed. Rep. of Germany--.

In Claim 6, "called" should be deleted.

Signed and Sealed this

Twenty-eighth Day of October 1980

[SEAL]

*Attest:*

SIDNEY A. DIAMOND

*Attesting Officer*    *Commissioner of Patents and Trademarks*